Patented Jan. 5, 1932

1,839,819

UNITED STATES PATENT OFFICE

WILLIAM WHITEHEAD, OF CUMBERLAND, MARYLAND, ASSIGNOR TO CELANESE CORPORATION OF AMERICA, A CORPORATION OF DELAWARE

EXTRACTION OF DYESTUFFS

No Drawing.   Application filed October 24, 1925.   Serial No. 64,574.

It has been well known that artificial fibers and the like, may be bleached by chemical processes. In these bleaching processes the dyestuffs themselves are destroyed and the fibers or the like are changed physically and chemically to such an extent that their dyeing properties are altered and that the luster, strength, or elasticity may be impaired.

This invention comprises a process for the extraction of dyestuffs from artificial fibers and the like, which is a physical process and results in a separation of the dyestuffs and fibers without changing either chemically or physically. Thereafter the dyestuffs may be used for future dyeing and the fibers and the like, may be used either without further change or they may be redyed or if desired they may be redissolved and used for the production of new fibers or for other purposes.

While the invention is applicable particularly to artificial fibers and the like, made from cellulose ethers and cellulose esters, and more especially to such products formed from cellulose acetate, it may be applied to other types of artificial fibers and the like. Also, notwithstanding the fact that it is particularly adapted for sulpho-ricinoleic acid dyestuffs, it may be used in connection with other dyestuffs such as are insoluble in water but soluble in organic solvents and usually applied from an aqueous dispersion.

The process of my invention may be carried out with a large number of different substances or solutions, but it is necessary that these solutions shall be swelling agents for the fibers and solvents for the dyestuffs. Some substances act both as swelling agents for the fibers and solvents for the dyestuffs, while in other cases the solution is formed of one substance which is a swelling agent for the fibers and another substance which is a solvent for the dyestuffs. It is also desirable at times to use a solution of three or more substances, two of which may be swelling agents for the fibers and solvents for the dyestuffs.

It is found that some solutions are capable of extracting the dyestuffs from artificial cellulosic materials of the types mentioned, by merely treating said material with the solution in the cold. In other cases the solution must be heated together with the cellulosic material in order to obtain the most advantageous results. The temperature may vary somewhat according to the boiling point of the solvent employed, but will usually be from about 54° to 72° C.

The length of the time of treatment will also vary according to the particular solution employed, but it has been found preferable to use sufficient successive treatments of relatively short periods, for example, ten minutes. The successive treatments may be carried out at gradually increasing temperatures. It has been found possible to extract the dyestuff entirely in thirty minutes by appropriate treatment with solutions heated to from 54° to 72° C.

In general, the treatment with those solutions which need to be heated will result in the extraction of the dyestuffs, leaving the fiber and other material comprising artificial cellulosic fibres unaltered as regards chemical and physical properties and also leaving the properties of the dyestuffs substantially unaltered. Those solutions which are capable of removing the dyestuffs in the cold state are much more powerful swelling agents for the fibers, and the like, and much greater care is necessary to prevent disintegration or physical alteration thereof.

The particular mechanical means for carrying out the process is immaterial and any suitable apparatus may be employed for the mechanical agitation of the cellulosic material and the extracting solutions or liquids.

A large number of substances have been found available for the carrying out of this process, the most important of which fall under certain general groups.

One of these is the aromatic hydrocarbon group which includes benzene, $C_6H_6$; toluene (methyl benzene), $C_6H_5CH_3$; xylene (dimethyl benzene) $C_6H_4(CH_3)_2$; ethyl benzene, trimethyl benzene, napthalene, hydronaphthalene, and the like.

If cellulose acetate yarn dyed by means of water insoluble coloring materials dispersed by sulpho-ricinoleic-acid, soaps, fatty acids, or other bodies of oily or fatty characteristics is mixed in benzene in the cold no dyestuffs are extracted. If the benzene is heated, the yarn swells gently and without any tendency to disintegrate, and the dyestuffs in the yarn enter into solution with the benzene. It is preferable to repeat the treatment a few times with fresh hot benzene and thereby all of the dyestuffs may be removed from the yarn, leaving the chemical and physical properties of both the yarn and the dyestuffs unaltered.

As stated above, it is preferable to employ temperature of from about 54° to 72° C. in this treatment. If the yarn is treated for three ten minute periods with benzene alone it will be found that about 30% of the dyestuff will remain and further treatment will be necessary to remove this.

However, it is found that if a small amount, preferably about 2%, of acetone is added to the benzene, that three ten minute treatments with this solution under the same temperature conditions as stated above will entirely remove the dyestuffs from the yarn without any change in the physical or chemical characteristics of either the yarn or the dyestuffs.

If desired there may be added some other substance to the benzene which substance is in itself a solvent and as an example thereof tetrachlorethane may be added. Also to the solution of acetone and benzene some other substance of similar qualities, such as trichlorethylene may be added. In general, however, it will be found that the benzene solution combined with a small portion of acetone will give extremely satisfactory results.

A group of substances which may also be employed for carrying out this invention includes the chlorine derivatives of unsaturated hydrocarbons. Of this group there may be specified dichlorethylene, $C_2H_2Cl_2$; trichlorethylene, $C_2HCl_3$; perchlorethylene, $C_2Cl_4$, and the like. Of these the preferable substance appears to be trichlorethylene, which is effective when hot and may be used similarly to benzene, as stated above. This effects the extraction of the dyestuffs without changing the physical or chemical characteristics of the dyestuffs or the fibers, and the like.

The dichlorethylene may be used in the cold for the extraction of the dyestuffs, but it is a sufficiently powerful swelling agent so that it tends to affect the luster and physical properties of the yarn, etc., unless the process is very carefully carried out.

The addition of a small amount of acetone to the trichlorethylene is of advantage similarly to its use with benzene, as described above. As also mentioned, the solution may include trichlorethylene, acetone, and benzene.

Various other substances may be employed, such as water and acetone, water, acetone and ammonium thiocyanate, water and diacetone-alcohol, and the like. In the case of water and acetone, the dyestuffs will be removed in the cold, but in such case the physical properties of the yarn, etc., under treatment are altered to such an extent that they are probably of use only as raw materials. If water and diacetone-alcohol form the solution, the process may be carried out in the hot state, but the percentage of water must be increased, if it is desired to prevent total disintegration.

The alcohols, such as methyl alcohol, ethyl alcohol, and the like, when used alone extract those dyes which are soluble in alcohol in the hot state, but are apt to alter very considerably the physical condition of the yarns. Water may be added to these alcohols to reduce excessive swelling or benzene or other milder swelling or non-swelling agent may be added for the same purpose, but physical alteration cannot be entirely prevented in this manner.

In discussing treatment with various substances, it has been pointed out above under what condition the physical properties of the fibers and the like, remain unaltered and when they are changed. It may be noted that in substantially all cases the dyestuffs are extracted unchanged. They may be combined with oil, sizes, or other finishes which have been applied to the materials under treatment and this may necessitate certain purification before the dyestuffs are again used. The only exception to this general rule as to the removal of the dyestuffs substantially unchanged, is when they are extracted by treatment of the materials with the chlorine derivatives above enumerated. These chlorine derivatives are subject to very gradual hydrolysis, especially when heated in the presence of moisture. The free acids developed by this hydrolysis will combine with any basic dyestuffs with which they are brought into contact. Otherwise there appears to be no alteration or destruction of the dyestuffs when removed according to this process by the use of any of the solutions above described. In any event, it may be noted that the recovery of dyestuffs is of less importance than the recovery of the fibers and the like.

It may be noted that the process may be varied considerably without departing from the spirit of the invention. It is to be noted that in the claims the solutions referred to may be a solution of a single substance or a solution of a mixture of substances. The materials comprising artificial cellulosic fibres may be either yarns, fabrics, or the like. It is obvious that the process may be applied to yarns consisting solely of cellulosic material or to yarns, fibers, or fabrics, consisting only in part of cellulosic materials.

While the process is particularly adapted to materials which have been dyed by means of water insoluble coloring materials dispersed by sulpho-ricinoleic-acid, soaps, fatty acids, or other bodies of oily or fatty characteristics it is also applicable to materials which have been dyed with other dyestuffs, particularly those which are applied to the yarn from a colloidal dispersion. Examples of such dyestuffs are:

Yellow, amino azo benzene; orange, para nitro benzene azo dimethylaniline; blue, methyl amino anthraquinone; red, 1 oxy 4 amino anthraquinone or benzene azo benzene azo monomethylaniline, etc.

Furthermore, the temperature conditions may vary since the highest temperature is the boiling point of the extracting medium and the lowest varies with the medium employed. Temperatures of from 28° to 72° C. have been found satisfactory. In general, it may be stated that the invention is to be regarded as limited only by the scope of the appended claims.

I claim:

1. A process for the extraction of dyestuffs from dyed material comprising artificial cellulosic fibres which comprises treating said material with a solution which is a swelling agent for the cellulosic material and a solvent for the dyestuffs, and includes an aromatic hydrocarbon.

2. A process for the extraction of dyestuffs from dyed material comprising artificial cellulosic fibres which comprises treating said material with a solution which is a swelling agent for the cellulosic material and a solvent for the dyestuffs, and includes an aromatic hydrocarbon and acetone.

3. Process for the extraction of dyestuffs from dyed material comprising fibres of an organic substitution derivative of cellulose, which comprises treating said material with a solution which is a swelling agent for the said material and a solvent for the dyestuffs.

4. A process for the extraction of dyestuffs from dyed material comprising fibres of an organic substitution derivative of cellulose, which comprises treating said material with a solution which is a swelling agent for the said material and a solvent for the dyestuffs, and includes an aromatic hydrocarbon.

5. A process for the extraction of dyestuffs from dyed material comprising fibres of an organic substitution derivative of cellulose, which comprises treating said material with a solution which is a swelling agent for the said material and a solvent for the dyestuffs, and includes an aromatic hydrocarbon and acetone.

6. A process for the extraction of dyestuffs from dyed material comprising fibres of an organic substitution derivative of cellulose which comprises treating said material with a solution which is a swelling agent for said material and a solvent for the dyestuffs, and includes benzene.

7. A process for the extraction of dyestuffs from dyed material comprising fibres of an organic substitution derivative of cellulose, which comprises treating said material with a solution which is a swelling agent for the said material and a solvent for the dyestuffs and includes benzene and acetone.

8. A process for the extraction of dyestuffs from dyed material comprising fibres of an organic substitution derivative of cellulose, which comprises giving said material successive treatments with a solution which is a swelling agent for the cellulosic material and a solvent for the dyestuffs.

9. A process for the extraction of dyestuffs from dyed material comprising fibres of an organic substitution derivative of cellulose, which comprises giving said material successive treatments at temperatures gradually increasing from about 54° to 72° C. with a solution which is a swelling agent for the cellulosic material and a solvent for the dyestuffs.

10. A process for the extraction of dyestuffs from dyed material comprising fibres of cellulose acetate which comprises treating said material with a solution which is a swelling agent for the cellulose acetate and a solvent for the dyestuffs.

11. A process for the extraction of dyestuffs from dyed material comprising fibres of cellulose acetate which comprises treating said material with a solution which is a swelling agent for the cellulose acetate and a solvent for the dyestuffs, and includes an aromatic hydrocarbon.

12. A process for the extraction of dyestuffs from dyed material comprising fibres of cellulose acetate which comprises treating said material with a solution which is a swelling agent for the cellulose acetate and a solvent for the dyestuffs and includes an aromatic hydrocarbon and acetone.

13. A process for the extraction of dyestuffs from dyed material comprising fibres of cellulose acetate which comprises treating said material with a solution which is a swelling agent for the cellulose acetate and a solvent for the dyestuffs, and includes benzene.

14. A process for the extraction of dyestuffs from dyed material, comprising fibres of cellulose acetate which comprises treating said material with a solution which is a swelling agent for the cellulose acetate and a solvent for the dyestuffs, and includes benzene and about 2% of acetone.

15. A process for the extraction of dyestuffs from dyed material comprising fibres of cellulose acetate which comprises treating the said material with a solution which is a swelling agent for the cellulose acetate and a solvent for the dyestuffs and includes benzene and acetone, the treatment being carried out at from 54° to 72° C.

16. A process for the extraction of dyestuffs from dyed material comprising fibres of cellulose acetate which comprises giving said material successive treatments at gradually increasing temperatures with a solution which is a swelling agent for the cellulose acetate and a solvent for the dyestuffs.

17. A process for the extraction of dyestuffs from dyed material comprising fibres of cellulose acetate which comprises giving said material successive treatments at temperatures gradually increasing from about 54° to 72° C. with a solution which is a swelling agent for the cellulose acetate and a solvent for the dyestuffs.

18. A process for the extraction of dyestuffs from dyed material comprising fibres of cellulose acetate which comprises giving said material successive treatments with a solution which is a swelling agent for the cellulose acetate and a solvent for the dyestuffs, and includes an aromatic hydrocarbon.

19. A process for the extraction of dyestuffs from dyed material comprising fibres of cellulose acetate which comprises giving said material successive treatments with a solution which is a swelling agent for the cellulose acetate and a solvent for the dyestuffs, and includes benzene and acetone.

20. A process for the extraction of dyestuffs from dyed material comprising fibres of cellulose acetate which comprises giving said material successive treatments at temperatures gradually increasing from about 54° to 72° C. with a solution which is a swelling agent for the cellulose acetate and a solvent for the dyestuffs, and includes benzene and acetone.

21. A composition for removing dyestuffs from dyed material comprising artificial cellulosic material, which includes benzene and a small amount of acetone.

22. A composition for removing dyestuffs from dyed material comprising artificial cellulosic material, which includes benzene and about 2% of acetone.

In testimony whereof, I have hereunto subscribed my name.

WILLIAM WHITEHEAD.